United States Patent [19]

Pelley

[11] Patent Number: 4,517,957
[45] Date of Patent: May 21, 1985

[54] INFLATION SUPPORTED SOLAR COLLECTOR

[76] Inventor: Ronald L. Pelley, 4032 Montego Dr., Huntington Beach, Calif. 92649

[21] Appl. No.: 542,690

[22] Filed: Dec. 5, 1983

Related U.S. Application Data

[60] Division of Ser. No. 346,519, Feb. 8, 1982, Pat. No. 4,422,445, which is a continuation of Ser. No. 154,808, May 30, 1980, abandoned.

[51] Int. Cl.³ .............................................. F24J 3/02
[52] U.S. Cl. .................................... 126/426; 126/416; 4/493; 4/499
[58] Field of Search ............... 126/415, 416, 426, 400; 52/2; 165/485; 4/493, 499; 237/56

[56] References Cited

U.S. PATENT DOCUMENTS

| 3,991,742 | 11/1976 | Gerber | 126/426 |
| 4,036,209 | 7/1977 | Press | 126/426 X |
| 4,160,443 | 7/1979 | Brindle et al. | 126/400 X |
| 4,160,523 | 7/1979 | Stevens | 126/426 |
| 4,182,307 | 1/1980 | Brindle et al. | 126/426 X |

FOREIGN PATENT DOCUMENTS 2068528  8/1981  United Kingdom ............... 126/415

Primary Examiner—Randall L. Green
Attorney, Agent, or Firm—Jack C. Munro

[57] ABSTRACT

An apparatus for collecting solar energy by heating a liquid to be subsequently used for heating purposes. The liquid is injected near the top of an inflated structure and when flowing downward (by gravity) within a solar panel which is supported by the inflated structure, the liquid absorbs solar energy.

2 Claims, 5 Drawing Figures

INFLATION SUPPORTED SOLAR COLLECTOR

REFERENCE TO PRIOR APPLICATION

This application is a division of patent application Ser. No. 346,519, filed Feb. 8, 1982, by the same title and by the same invention now U.S. Pat. No. 4,422,445, which in turn is a continuation of Ser. No. 154,808 filed May 30, 1980 and abandoned.

BACKGROUND OF THE INVENTION

This invention relates generally to the field of solar collectors for conversion of solar energy to space heating and more specifically, to a solar collector which is supported by a fan inflated structure and which uses a liquid for the collection of solar energy.

This nation faces a major problem in conservation of energy, a problem commanding sharply increasing priorities as petroleum feedstocks become scare and alternate energy sources, such as nuclear power encounter political resistance or technological problems. In addition, due to the rapidly rising energy costs of petroleum energy, alternate energy sources such as solar energy is receiving considerable attention. Although solar energy is widespread and abundant, it is not without its problems. For instance, for applications such as greenhouse heating, the typical solar collector is generally too expensive to justify its use. Although several low cost inflatable solar collectors have been proposed, they typically use air as the solar energy collecting medium. As air has little inherent storage capacity, the designs are generally inapplicable for nighttime space or greenhouse heating.

SUMMARY OF THE INVENTION

The primary objective of the instant invention is to provide an efficient solar collector which is economical in providing thermal energy.

Another objective of this invention is to provide a solar collector which can store the energy for later usage. This is achieved by using a liquid to absorb the energy and a tank for storage of this energy.

Another objective of this invention is to provide a solar collector which is highly resistant to wind loads and which is not subject to damage caused by liquid freezing duging cold periods.

This and other objectives are accomplished with the design of the instant invention whereby solar energy is collected and is used for heating or drying purposes, such as greenhouse, space, pool, or hot water heating. The invention includes a generally elongated, inflatable, tubular, film (sheet material) housing. A fan for inflating the housing is used to provide the fluid pressure for supporting the structure. A liquid typically water, is pumped upward to near the top of the flexible housing through piping or tubing. The liquid is then injected from the pipes to the internal portion of a solar panel. As the liquid flows downward by gravity through the solar panel, the liquid absorbs solar energy. For a typical application, the liquid is stored and used later when the energy demand is greater.

BACKGROUND OF THE INVENTION

Figure 1:
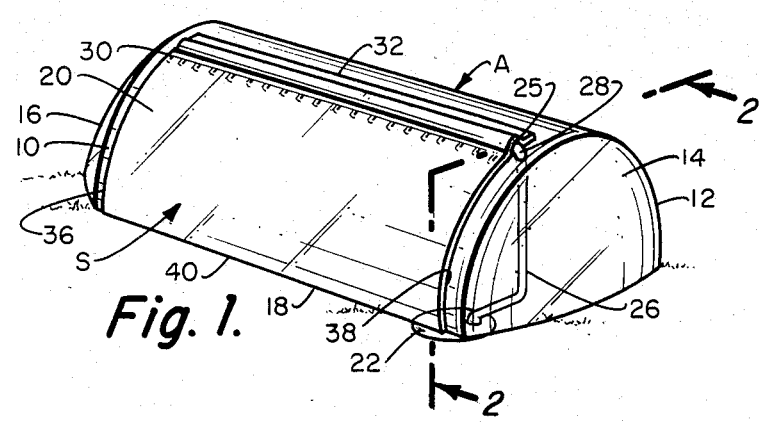
FIG. 1 is a perspective view o4 the solar collector of the subject invention in the inflated configuration.
Figure 2:
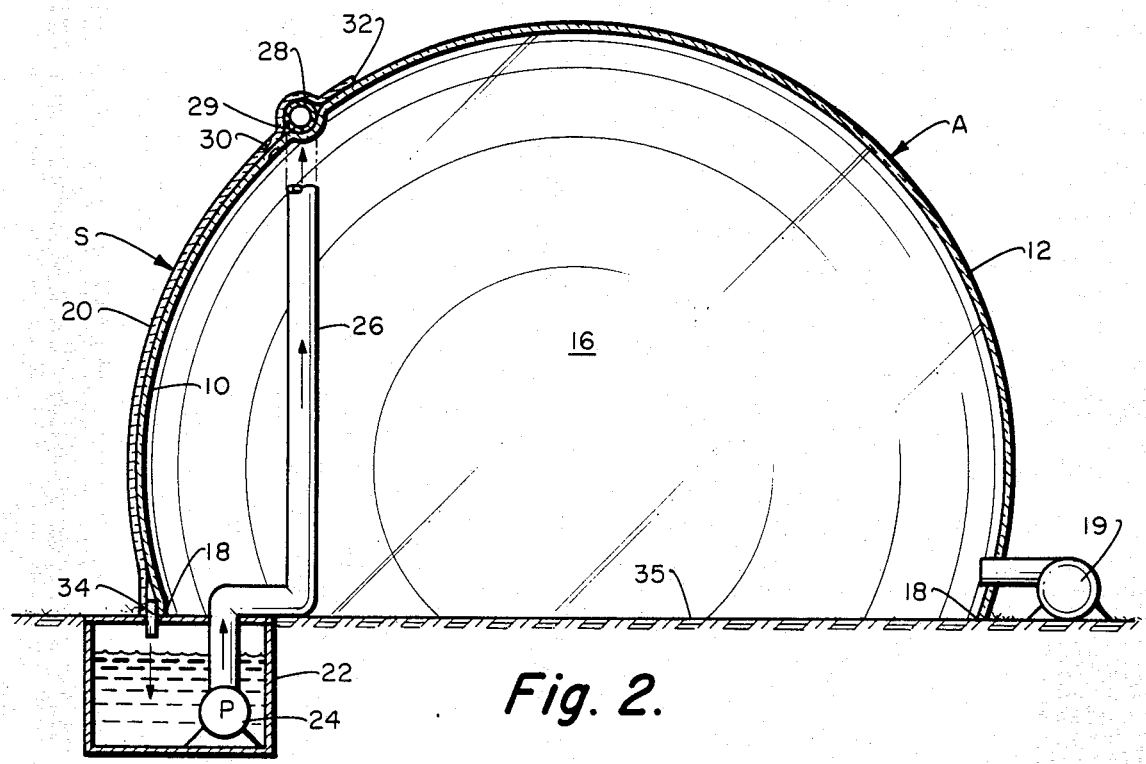
FIG. 2 is a front view of the solar collector taken along line 2—2 of FIG. 1.
Figure 3:
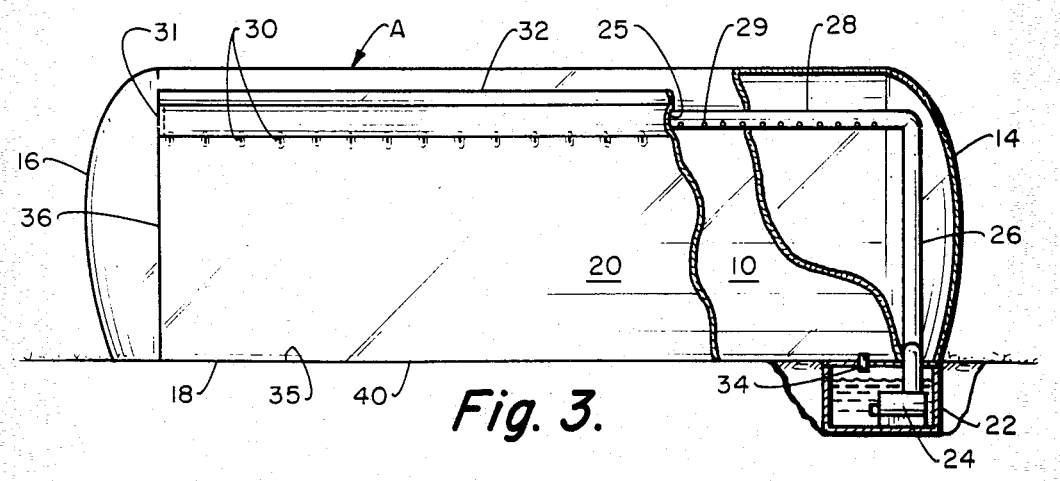
FIG. 3 is a transverse, partly in cross-section, view of the solar collector of this invention.

Referring particularly to the drawing, and more particularly to FIGS. 1, 2 and 3, there is shown a generally elongated inflatable assembly A embodying the instant invention. The solar collector assembly A includes an inflatable housing which has front and rear longitudinal walls 10 and 12 and end walls 14 and 16, which are attached to the ground 18 or support structure in any conventional manner. An air blower 19 is used to supply the pressurized air such that the assembly A may be inflated and erected. A sheet material film of flexible material 20 is attached to the front assembly wall 10 at the edges 32, 36, 38 and 40. Either, or both, the sheet 20 and the front wall 10 should be made of a material which is highly absorbant to solar radiation. The two sheets 10 and 20 constitute the energy absorption region of the solar collector assembly A and is designated the solar panel S.

In the arrangement illustrated in FIG. 2, a pump 24 is located in a water storage tank 22, which is preferably insulated. Flexible tubing or piping 26 is connected to the pump 24 and extends adjacent the apex of the housing assembly A, then through a small opening 25 in the solar panel and connects to a perforated header pipe 28. The heater pipe 28 has a series of small distributed openings 29 and is capped on one end 31. When the pump 24 is turned on, the water flow is injected within a narrow chamber between sheets 10 and 20. As the water flows downward due to gravity, the water absorbs solar energy. At the bottom of the solar panel S, the heated water flows through a pipe 34 and back to the tank or storage facility 22. The tank as illustrated is placed below the ground level 35. However, the tank 22 may be located above the ground 35, but a pump (not shown) would be needed to pump the liquid from the bottom of the solar panel S to the tank. Operationally, the pump 24 would generally be activated when the temperature of the solar panel S exceeds the tank water temperature. To support the header pipe, the solar collector sheets 10 and 20 are bonded together forming several bond locations 30.

An additional use of the assembly A would be to use the space inside the assembly A as a greenhouse and grow plants or vegetables. For this usage, the solar panel sheets 10 and 20 should consist of clear plastic and the solar collector liquid should be transparent to the solar energy spectrum required for plant growing. However, materials, such as copper chloride, can be added to the water for absorbing the solar energy spectrum which is not required for plant growth. Another optional use of the solar collector assembly A is for water chilling. For this function, the liquid is circulated through the solar panel S during nighttime.

Figure 4:
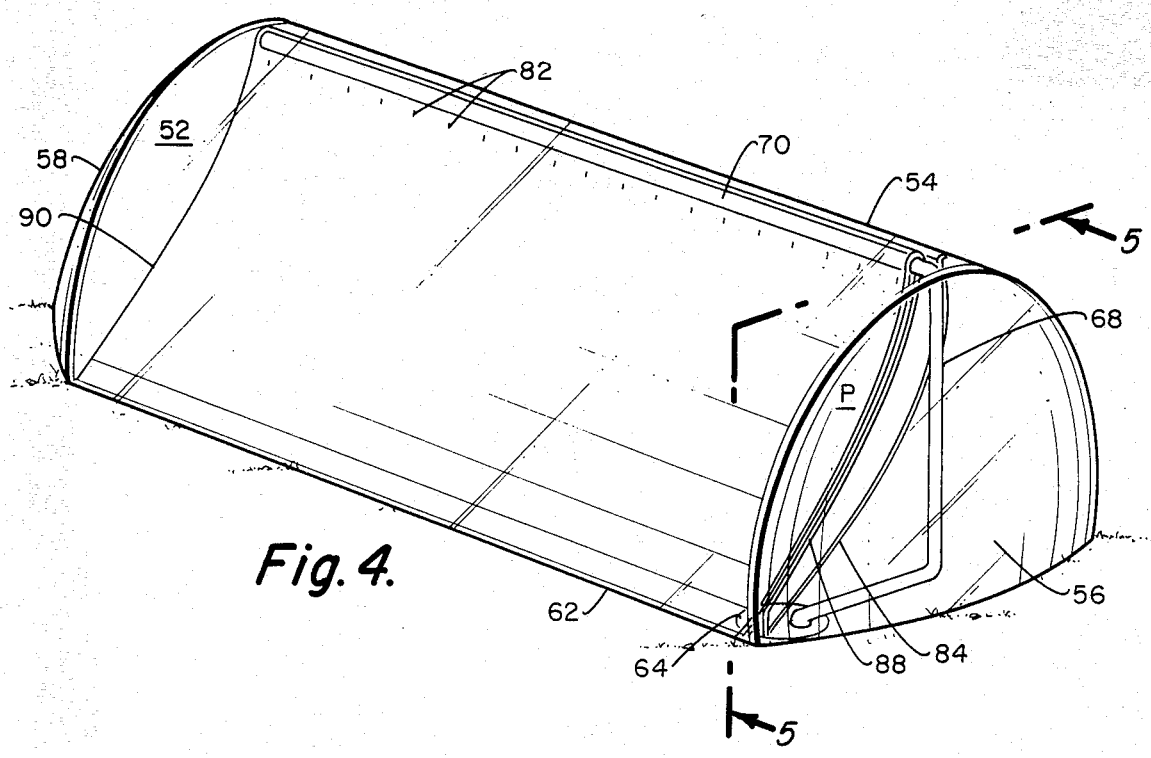
FIG. 4 is a perspective view of an alternate form of the solar collector of this invention.
Figure 5:
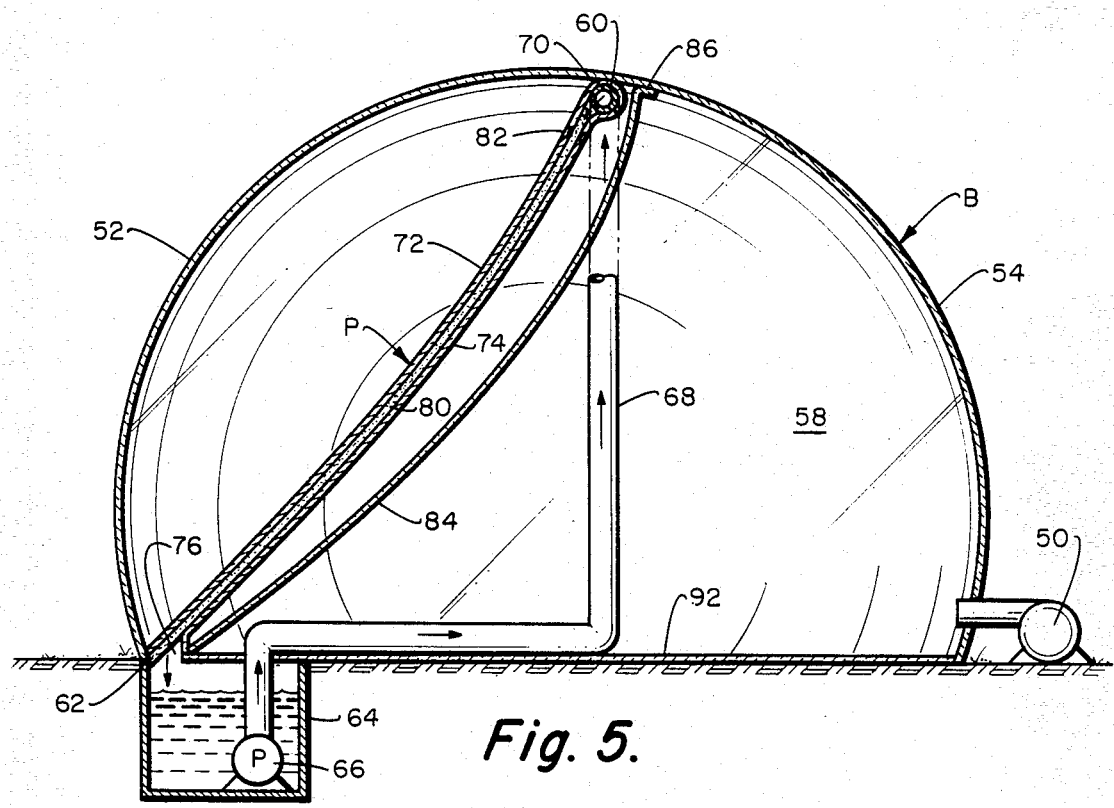
FIG. 5 is a transverse, cross-sectional view taken along line 5—5 of FIG. 4 of the alternate form of the solar collector of this invention.

A variation of the inflatable solar collector design is illustrated in FIGS. 4 and 5. The advantage of this design is that it results in greater solar collection efficiency through providing solar panel insulation by means of an air space both on the front and back of the solar panel.

As illustrated in FIGS. 4 and 5, a blower 51 is used to provide the pressurized air for inflating the solar collection assembly B. The assembly B has front and back longitudinal walls 52 and 54 and end walls 56 and 58. A solar panel P is attached to the top of the assembly B at position 60 and to the ground plane 62. From the tank 64, the solar collection liquid 66 is pumped through a flexible pipe 68 upward to a header pipe 70 and injected between two flexible sheets of plastic film 72 and 74. Placed between the two films 72 and 74 is an absorbant or weave material 80 whose purpose is to evenly distribute the liquid as it flows inside the solar panel P. After flowing by gravity through the solar panel P, the solar energy collecting liquid is allowed to drain from the solar panel P through an opening 76 and back into the storage facility 64. To support the header pipe 70 and the absorbant material 80, the solar panel sheets 72 and 74 are locally bonded together forming several bonding locations 82.

A separate sheet of plastic 84 is attached to the top of the assembly 86 and to the ends of the solar panel 88 and 90, and also at the bottom of the solar panel 62. The function of the plastic sheet 84 is to provide an insulating dead air region behind the solar panel P. To equalize the pressure across the insulating sheet 84, a small opening, (not shown) may be added to the insulating sheet 84. A separate plastic sheet 92 is laid above the ground plane or support structure and is used to prevent moisture from being sucked from the ground and reducing the solar collection efficiency.

The front wall of the solar assembly B should be made of a material which is transparent to solar radiation, i.e., clear plastic. In addition, one or more of the sheets 72, 74 and 80 which make up the solar panel P should be of a material which is highly absorbant to solar radiation.

The solar panels S and P as illustrated in FIGS. 1 through 5 were designed to be lightweight and of simple construction. However, the inflatable structures A and B can also be used to support heavier and more complex solar panels. For example, assuming a solar collector assembly with a floor area of 1,000 square feet, (i.e., 100 ft.×10 ft), and a common inflation fan which has a pressure capability of 0.5 inches of water, the total lifting force on the assembly is over 2,500 pounds. With lifting forces of this magnitude, the inflatable assemblies A or B can be used to support heavier solar panels, such as rigid or semi-rigid solar panels.

As discussed previously, a plastic film 84 is used to provide an insulating dead air region behind the solar panel P. An alternate means, (not shown) of insulating the solar panels P or S would be to use two or more sheets of plastic which are locally bonded together and in which a matrix of air pockets are trapped between the plastic sheets. This is similar to a material which is commonly used in packaging. The plastic trapped air insulating material could be attached to either or both the front or back faces of the solar panels.

The discussion of the solar collector assemblies shown in FIGS. 1-5 have been generally limited to those functions which relate to the collection and storage of solar energy. For applications such as greenhouses or space heating, means of distribution (not shown) the collected solar energy to the desired locations would obviously be required. In addition, for optimization of the collection of the solar energy, various controls, (not shown) such as thermostats can be effectively included with the solar assemblies.

While the above description contains many specificities, these should not be construed as limitations on the scope of the invention, but rather as an exemplification of one preferred embodiment thereof. Many other variations are possible, for example, the position of where the solar panel P attached 60 to the assembly B can be varied to correspond to the sun position changes at various times of the year. Another variation would be to bleed off some of the heated air inside the assemblies, said heated air to be used for daytime space heating.

What is claimed is:

1. A solar energy collecting apparatus comprising:
a thin, flexible walled housing;
an air blower connecting to said housing, said air blower to inflate said housing forming a rigid walled structure, with said housing located on a supportive surface said housing forming a totally enclosed chamber, said rigid walled structure having an interior surface and an exterior surface, said interior surface defining the extremity of said totally enclosed chamber;
a film assembly mounted within said totally enclosed chamber, said film assembly having a front surface and a rear surface, said film assembly having a top edge and a bottom edge, said top edge being attached to said interior surface, said bottom edge being located directly adjacent said supportive surface, the portion of said front surface of said film assembly between said top edge and said bottom edge being spaced from said interior surface, a dead air insulating region lay located directly adjacent said rear surface, a narrow chamber formed within said film assembly;
a liquid inlet pipe mounted within said narrow chamber, said liquid inlet pipe located at said top edge;
a reservoir, said reservoir to contain a liquid;
means for supplying said liquid from said reservoir to said liquid inlet pipe; and
a discharge opening attached to said bottom edge connecting with said narrow chamber, said liquid to be conducted through said inlet pipe into said narrow chamber and through said discharge opening into said reservoir.

2. The solar energy collecting apparatus as defined in claim 1 wherein:
a quantity of flow distributing material located within said narrow chamber, said flow distribution material to evenly distribute the flow of said liquid between said top edge and said bottom edge.

* * * * *